Apr. 24, 1923.

J. M. ROHLFING

BRAKE

Filed April 15, 1922

1,452,528

INVENTOR
JOHN M. ROHLFING.
BY J. H. Gibbs

ATTORNEY.

Patented Apr. 24, 1923.

1,452,528

UNITED STATES PATENT OFFICE.

JOHN M. ROHLFING, OF PLAINFIELD, NEW JERSEY, ASSIGNOR TO AMERICAN CAR AND FOUNDRY COMPANY, OF NEW YORK, N. Y., A CORPORATION OF NEW JERSEY.

BRAKE.

Application filed April 15, 1922. Serial No. 552,955.

*To all whom it may concern:*

Be it known that I, JOHN M. ROHLFING, residing at Plainfield, Union County, State of New Jersey, and being a citizen of the United States, have invented certain new and useful Improvements in a Brake, of which the following is a full, clear, and exact description, such as will enable others skilled in the art to which it appertains to make and to use the same, reference being had to the accompanying drawings, which illustrate the preferred form of the invention, though it is to be understood that the invention is not limited to the exact details of construction shown and described, as it is obvious that various modifications thereof within the scope of the claims will occur to persons skilled in the art.

Figures 1, 2:
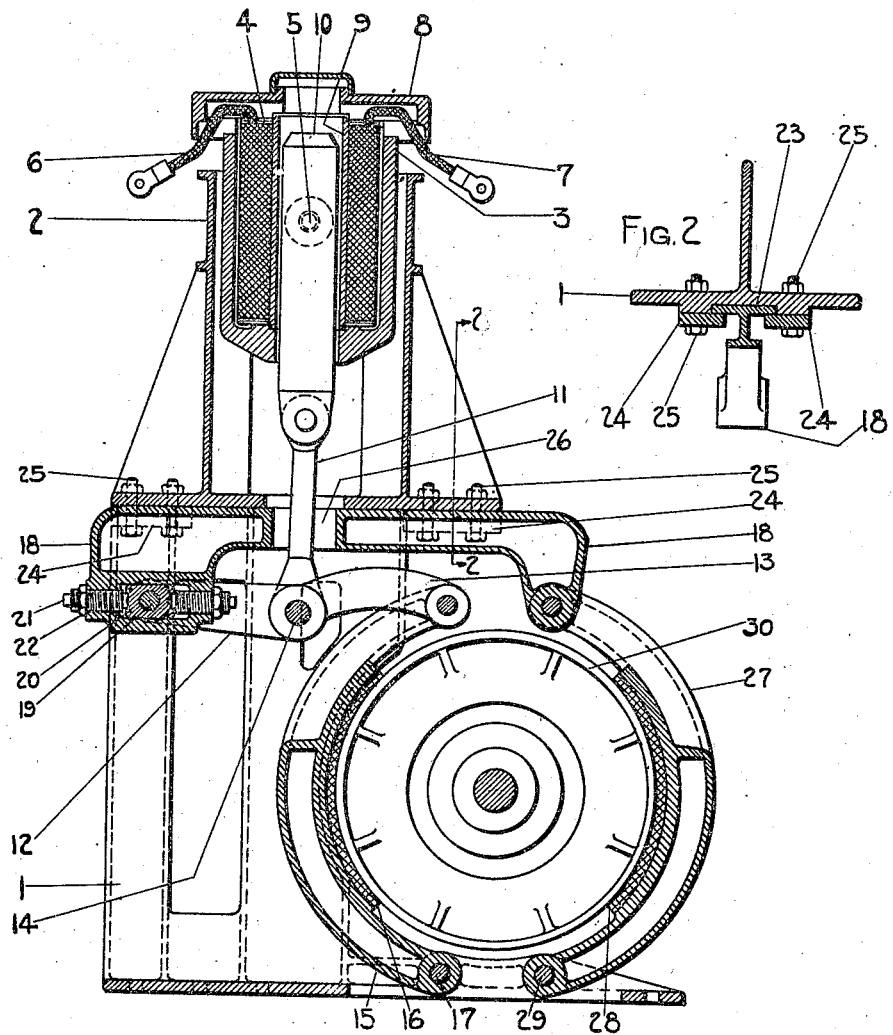
Fig. 1 is a vertical section of my improved brake.
Fig. 2 is a section taken on the line 2—2 of Fig. 1.

It is the object of my invention to provide an improved electrically operated brake of a type which is applied electrically and released by gravity and which is simple in construction and efficient and reliable in operation.

With these and other objects in view my invention comprises a support 1 having a tubular portion 2, in which a solenoid casing 3 carrying a solenoid 4 is pivotally supported on trunnions 5. Current is supplied to the solenoid 4 by the conductors 6 and 7 and the solenoid is protected by a detachable cover 8.

Slidably mounted in a bushing 9 in the solenoid 4 is an armature 10 pivotally connected to one end of a link 11 which has its other end pivotally connected to the toggle arms 12 and 13 by the pin 14 which pivotally connects the toggle arms 12 and 13. The toggle arms 13 are pivotally connected to a brake head 15 carrying a brake shoe 16 and pivotally connected to the support 1 by a pin 17. The toggle arms 12 are pivotally and adjustably connected to a link 18 by a pivot pin 19 which is adjustable in a slot 20 in the link 18 and held in adjusted position by adjusting screws 21 and lock nuts 22. The link 18 is slidable in a groove 23 formed in the support 1 and held in the groove by guide plates 24 attached to the support 1 by bolts 25. The link 18 is provided with an elongated opening 26 through which the link 11 extends and has a downwardly projecting end pivotally connected to a brake head 27 which carries a brake shoe 28 and is pivotally connected to the support 1 by a pin 29.

Energizing the solenoid 4 will cause the solenoid 4 to attract the armature 10 and operate the toggle arms 12 and 13 to force the brake shoes 16 and 28 into engagement with the brake drum 30 while deenergizing the solenoid 4 will cause the solenoid 4 to release the armature 10, permitting the arm 10 to fall and operate the toggle arms 12 and 13 to withdraw the brake shoes 16 and 28 from the brake drum 30.

What I claim is:

1. In a brake, brake heads, a member connected to one of said brake heads, toggle arms connecting said member and the other brake head and means to operate said toggle arms.

2. In a brake, a support, brake heads, a member carried by said support and connected to one of said brake heads, toggle arms connecting said member and the other brake head and operating means for said toggle arms.

3. In a brake, brake heads, a member connected to one of said brake heads, toggle arms adjustably connecting said member and the other brake head and operating means for said toggle arms.

4. In a brake, a support, brake heads, a member slidably mounted on said support and connected to one of said brake heads, toggle arms connecting said member and the other brake head and operating means for said toggle arms.

5. In a brake, a support, brake heads, a member slidably mounted on said support and connected to one of said brake heads, a toggle arm adjustably connected to said member, a toggle arm connected to the other brake head and operating means for said toggle arms.

6. In a brake, a support, a member slidably mounted on said support, a brake head connected to said member, toggle arms connected to said member, a brake head connected to said toggle arms and electrical operating means for said toggle arms.

7. In a brake, a support, brake heads pivotally mounted on said support, a member slidably mounted on said support and connected to one of said brake heads, toggle arms connecting said member and the other brake head and operating means for said toggle arms.

8. In a brake, a support, brake heads pivotally mounted on said support, a member slidably mounted on said support and connected to one of said brake heads, toggle arms connecting said member and the other brake head and electrical operating means for said toggle arms pivotally mounted on said support.

9. In a brake, a support, brake heads pivotally mounted on said support, a member slidably mounted on said support and connected to one of said brake heads, a toggle arm adjustably connected to said member, a toggle arm pivotally connected to the other brake head, a solenoid pivotally mounted on said support and means operated by said solenoid connected to said toggle arms.

10. In a brake, a support, brake heads pivotally mounted on said support, a member slidably mounted on said support and connected to one of said brake heads, toggle arms connecting said member and the other brake head, a solenoid, an armature for said solenoid and means connecting said armature and toggle arms and passing through an opening in said member.

In witness whereof I have hereunto set my hand in the presence of two witnesses.

JOHN M. ROHLFING.

Witnesses:
ELLEN G. WEBSTER,
R. W. SMITH.